June 11, 1963 W. SHRINER 3,093,737
NUCLEAR RADIATION DETECTOR HAVING ELECTROSTATICALLY
CHARGEABLE ELEMENTS
Filed Oct. 21, 1960
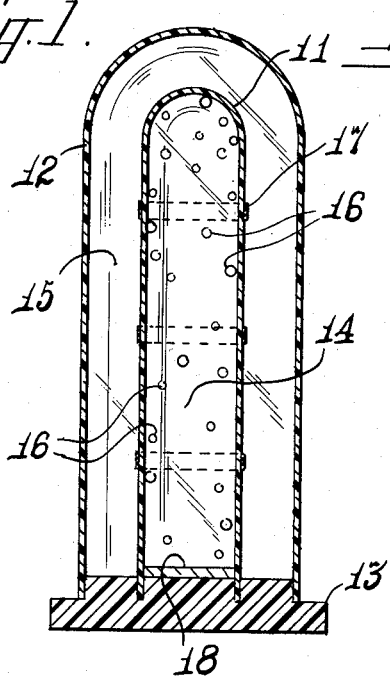
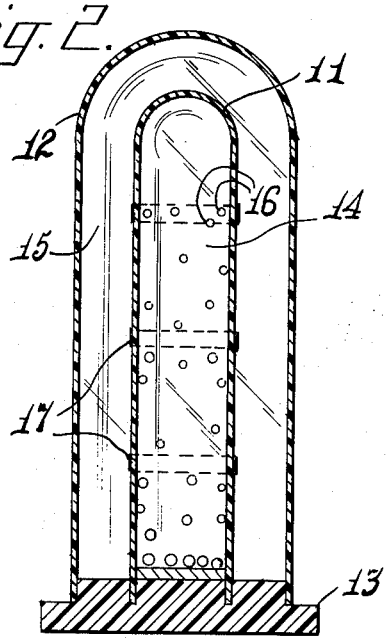
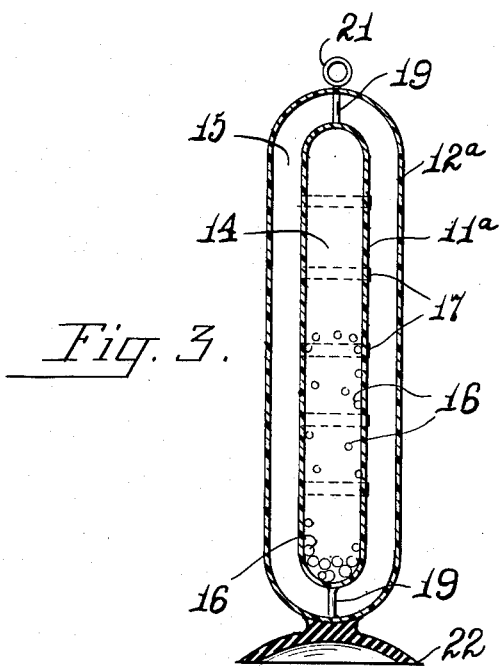
INVENTOR.
WALTER SHRINER
BY
Attorney

United States Patent Office 3,093,737
Patented June 11, 1963

3,093,737
NUCLEAR RADIATION DETECTOR HAVING ELECTROSTATICALLY CHARGEABLE ELEMENTS
Walter Shriner, 1133 S. 2nd St., Springfield, Ill.
Filed Oct. 21, 1960, Ser. No. 64,168
6 Claims. (Cl. 250—83.3)

The invention relates to instruments for the detection and measurement of radiation intensity, and is more particularly concerned with the novel construction and assembly of a gamma ray detection and measuring device requiring no external source of electrical current.

Various kinds of devices have been used for detecting and measuring nuclear radiation. Such devices are electronic instruments requiring an outside source of electric current, or are of a nature that incorporate means capable of changing color in proportion to the amount of radiation to which they are subjected. Such known devices are either too costly or are not suited for prolonged usage either because they require periodic recharging or are not reusable.

The herein disclosed device is entirely self contained, requiring no outside source of electric current for purposes of recharging and is capable of reuse so long as its physical structure is not damaged or destroyed.

More particularly the device, which may be embodied in numerous physical forms, is comprised essentially of an ion chamber of anhydrous air or quenching gas defined by a hermetically sealed electrically non-conducting plastic capsule which is insulated from atmosphere and surrounding electrostatic influences by a surrounding shell which confines an insulating body of anhydrous air or quenching gas. Both the capsule and shell are transparent and the ion chamber contains a selected quantity of free floating elements of the same or different size and weight and all comprised of material suitable for retaining an electrostatic charge. A series of graduation markings may be provided on the wall of the ion chamber to afford visual indication of the condition of the instrument.

To use the device, it is charged by being shaken or otherwise agitated in a manner to distribute the elements around the interior of the ion chamber. Such agitation develops an electric charge of opposite polarities on the surface of the chamber wall and on the elements, causing the elements to be attracted to and adhere, in a random pattern, on the inside surface of the capsule wall. However, should external ionizing radiation be present, the electrostatic charge of the chamber wall and elements will be reduced in proportion to the quantity of the ionizing radiation which has penetrated the wall of the ion chamber and should the charge of any of the elements be negatived by such ionizing radiation such elements will fall to the bottom of the ion chamber when the device is in an upright position. The degree to which the elements are attracted to the wall is an indication of the electrostatic charge developed and of the intensity of ionizing radiation present in the surrounding atmosphere. This can be observed by viewing the device to ascertain the number and size of the elements remaining attracted to the wall and their elevation in relation to the graduation markings.

It is, therefore, an object of the invention to provide a novel instrument for detecting the presence of ionizing radiation and its intensity.

Another object is to provide an instrument of the character referred to which requires no outside source of electric energy.

Another object is to provide an instrument of the character referred to which is inexpensive to manufacture, simple in its operation and very accurate and serviceable.

Other and further objects and advantages of the invention will become apparent to those skilled in the art from the following detailed description of the annexed drawings, which disclose exemplary embodiments of the invention.

In the drawings:

FIG. 1 is a longitudinal sectional view, on an enlarged scale, of an exemplary embodiment of the invention, showing it charged and outside a field of ionizing radiation.

FIG. 2 is a view similar to FIG. 1, showing the device subjected to ionizing radiation.

FIG. 3 is a longitudinal sectional view of another physical embodiment of the invention.

Referring to the accompanying drawings which illustrate representative physical embodiments of the invention, and particularly to the FIG. 1 disclosure, the instrument comprises an inner capsule 11 and an outer shell 12. The capsule and shell are mounted on and hermetically sealed in a base 13 in suitable fashion but preferably as shown with the open ends of the capsule and shell secured thereto as with a non-volatile cement. The base 13 is of electrical insulation material whereas the material of the capsule and shell is a transparent shape-retaining plastic substance. At least the material of the capsule is of a nature capable of accepting and retaining an electrostatic charge. The base 13, capsule 11 and shell 12 define two hermetically sealed chambers 14 and 15, each of which contains anhydrous air or, in lieu thereof, the inner chamber 14 may contain a suitable quenching gas or vapor, or a combination of anhydrous air and such gas. The air or air/gas content of the chambers is required for operation of the instrument. Preferably, the diameter of shell 12 is at least two times the diameter of the capsule 11.

The inner chamber 14 constitutes the ion chamber of the instrument and it contains a quantity of free floating light weight elements such as balls or pellets 16, of electrically chargeable material, for example, plastic, metal or other substance. For purposes to be described presently, a plurality of longitudinally spaced apart rings or bands 17 are provided on the exterior surface of the inner shell. These rings or bands, which may be painted thereon or applied as separate elements, are of a suitable readily discernable color, such as for example, red, and the balls or pellets are of a contrasting color, such as, for example, blue, yellow, amber, etc., so as to be clearly visible through the plastic capsule and shell and distinguishable from the bands 17.

The relationship of the parts and their functions can best be described in connection with the description of operation which follows.

The instrument is charged electrostatically by shaking or otherwise agitating same in a manner to cause the balls or pellets to scatter throughout the interior of the ion chamber. The inside surface of the ion chamber wall and the surfaces of the balls or pellets will develop electrostatic charges of opposite polarity causing the latter to be attracted to and arrange themselves in random positions on the said wall as shown in FIG. 1. However, should the atmosphere surrounding the instrument be subjected to ionizing radiation, the ion rays of which penetrate the walls of the instrument, then air molecules in the ion chamber form positively and negatively charged particles. These oppositely charged particles are attracted to either the balls or the wall of the ion chamber, depending upon their polarity, and reduce the electrostatic charge on said balls and wall in proportion to the amount of electrostatic charge in the particles. Thus the oppositely charged surfaces of the ion chamber and balls will be neutralized to the extent of ionizing radiation to which they are subjected.

When all of the balls or pellets are of a like size and weight, they will all be neutralized when exposed to a given maximum amount of radiation and will fall to the bottom of the ion chamber. If only partially neutralized the gravitational pull on the balls will be effective to partially overcome the remaining electrostatic force and will cause them to slide downwardly. Their positions of rest with respect to the signal bands 17 is indicative of the amount of ionizing radiation which has penetrated the ion chamber. As radiation increases neutralizing effect on the electrostatic charge is increased thus affording a further drop in the positions of the balls.

In order to adapt the instrument to register several different degrees of radiation without recharging, the balls may be of two, three or more given sizes and/or weights so as to render each group responsive to different electrostatic forces and gravitational pull. For example, a ball having a small electrostatic surface will be neutralized under the influence of less ionizing radiation than a ball of the same weight having a larger electrostatic surface. Similarly, a heavier ball of a given size will be more readily subjected to the influence of gravity than a like size wall of lesser weight and will be more responsive to a given amount of ionizing radiation. These various groups of balls may be colored differently to facilitate observation.

Now, when such an instrument is exposed to a given nominal ionizing radiation, the electrostatic charge in the smaller or heavier balls will be sufficiently or totally neutralized and they will move downwardly or fall by gravity to the bottom of the instrument. When subjected to the same radiation, the balls having the less specific gravity (lighter) or greater electrostatic charge (larger) will remain attracted to the ion chamber wall but under lower electrostatic attraction and hence they will move downwardly to a lower level. Should the ionizing radiation be increased, an additional number of balls will have their electrostatic charge reduced or perhaps neutralized and they will slide toward or fall to the bottom. Each successive increase in ionizing radiation will cause increased partial or total neutralization of the charge attracting progressively lighter or smaller balls to the wall. Thus it will be seen that the movement of the balls from their positions of attraction assumed when fully charged is determined by the amount of ionizing rays penetrating the ion chamber and the electrostatic force or specific gravity of the balls. In required instances a condenser surface 18 may be arranged within the ion chamber preferably on the base 13.

In the FIG. 3 illustration, the instrument is designed to be worn on the person or fixedly positioned. As shown, the ion chamber capsule 11a is suspended within a surrounding shell 12a by insulating connectors 19. A ring 21 may be integrally attached to shell 12a for receiving a pin or chain or a suction cup 22 may be attached to the bottom end of said shell 12a. Its function and operation is the same as described hereinabove.

The instruments herein disclosed are not easily influenced by temperature and humidity and only very slow discharge of the ion chamber is caused by background radiation from natural sources. It requires no special technological knowledge for its operation.

While I have shown certain preferred embodiments of my invention and described them more or less precisely as to details, it is to be understood that the invention is not to be limited thereby, as changes may be made in the arrangement and proportion of parts, and equivalents may be substituted without departing from the spirit and scope of the invention.

What is claimed and desired to be secured by Letters Patent of the United States is:

1. A device for ionizing ray detection and measurement comprising a transparent electrically non-conducting plastic capsule defining an ion chamber, an insulating wall spaced from and surrounding said capsule, means sealing the space between said capsule and insulating wall to define a space barrier for outside electrostatic influence, and a plurality of elements loosely confined in said chamber, said elements and capsule being electrostatically chargeable in opposite polarities so as to cause the elements to be attracted by and adhere to the inside surface of said capsule, and the elements being responsive to gravitational forces upon neutralization of their electrostatic charge by induced ionizing radiation.

2. A device for ionizing ray detection and measurement comprising a transparent electrically non-conducting hermetically sealed capsule defining an ion chamber, a transparent insulating wall spaced from and surrounding said chamber, and a plurality of electrostatically chargeable elements loosely contained in said ion chamber, said elements and capsule being electrostatically chargeable in opposite polarities so as to cause the elements to be attracted by and adhere to the inside surface of said capsule, and the elements being responsive to gravitational forces upon neutralization of the electrostatic charge by induced ionizing radiation.

3. A device for ionizing ray detection and measurement comprising a base, a transparent electrostatically chargeable capsule mounted on said base and defining an ion chamber, a transparent insulating wall mounted on said base and spaced from and enclosing said capsule, and a plurality of electrostatically chargeable elements loosely confined in said ion chamber, said elements and capsule being electrostatically chargeable in opposite polarities so as to cause the elements to be attracted by and adhere to the inside surface of said capsule, and the elements being responsive to gravitational forces upon neutralization of the electrostatic charge by induced ionizing radiation.

4. A device of the character recited in claim 2, in which calibration markings are carried on the ion chamber wall.

5. A device of the character recited in claim 2, in which the wall of the ion chamber is comprised of plastic material.

6. A device of the character recited in claim 2, in which the elements have different electrostatic properties.

References Cited in the file of this patent

UNITED STATES PATENTS

| | | |
|---|---|---|
| 2,700,109 | Argabrite | Jan. 18, 1955 |
| 2,731,568 | Failla | Jan. 17, 1956 |
| 2,741,706 | Futterknecht | Apr. 10, 1956 |